United States Patent
Charif et al.

(10) Patent No.: US 9,055,072 B2
(45) Date of Patent: Jun. 9, 2015

(54) METHOD FOR AUTOMATED GENERATION OF MINIMAL PARTITIONING OF A PROCESS SPECIFICATION FOR SUPPORTING ITS DISTRIBUTED EXECUTION

(71) Applicant: Xerox Corporation, Norwalk, CT (US)

(72) Inventors: Yasmine Charif, Rochester, NY (US); Andres Quiroz Hernandez, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/860,123

(22) Filed: Apr. 10, 2013

(65) Prior Publication Data

US 2014/0310328 A1    Oct. 16, 2014

(51) Int. Cl.
*G06F 15/16* (2006.01)
*H04L 29/08* (2006.01)

(52) U.S. Cl.
CPC ..................... *H04L 67/10* (2013.01)

(58) Field of Classification Search
CPC .............. H04L 29/08072; H04L 29/06; H04L 29/08135; H04L 29/08144; H04L 29/0809
USPC ................................................ 709/201, 202
See application file for complete search history.

(56) References Cited

U.S. PATENT DOCUMENTS

2006/0274062 A1* 12/2006 Zhang et al. ................... 345/420
2013/0024479 A1* 1/2013 Gong et al. .................... 707/798

OTHER PUBLICATIONS

U.S. Appl. No. 13/403,440, filed Feb. 23, 2002, Quiroz et al.
Hens, P. et al., "Transforming Standard Process Models to Decentralized Autonomous Entities," 5th SIKS/BENAIS Conference on Enterprise Information Systems, Nov. 16, 2010.

* cited by examiner

*Primary Examiner* — Vivek Srivastava
*Assistant Examiner* — Hermon Asres
(74) *Attorney, Agent, or Firm* — Richard H. Krukar; Kermit D. Lopez; Luis M. Ortiz

(57) ABSTRACT

A process definition is partitioned for execution in a system architecture that enables the communication and meta-orchestration of multiple distributed engines. The partitioning method creates separate scripts for each group (execution engine, computer, distributed computer, etc.) where each script has the same representation as the original control flow, but keeps local services and replaces remote services with data flow messages and synchronization points. This method ensures that the resulting process has the same result as the original process executed with a single engine. Additional advantages include: the number of partitions of the process is minimized to equal to the number of distributed engines; the communication between engines is minimized to only data flow messages; there is no dependency on a specific process representation such as BPMN; and reduced implementation complexity.

17 Claims, 10 Drawing Sheets

For each group g
    Replicate the workflow graph as fragment g
    Initialize state := *local*
    For each activity a with label l in traversal of fragment g
        If l == g then
Case-I            If state == *local* then continue    // Local activity
Case-II          Else    // Coming from local
                state := *local*    // Coming from remote
Case-IIa            If parent == *join* then    // Synchronized or unsynchronized
                    Insert Receive { a } before parent
Case-IIb            Else
                    Insert Receive { a } before activity a
Case-IIb*            While parent== *conditional split*, replace parent with *unconditional split*    // Updating parent
            End if
        Else    // Remote activity
Case-III            If state = *local* then    // Coming from local

FROM FIG. 1A

```
Case IIIa      state := remote                                                      // Synchronized or unsynchronized
               If parent = join then
                   Insert Send { l, a } before parent                                 // Connect parent to next element
                   Remove activity a
Case IIIb      Else
                   Unless parent = Start, replace activity a with Send { l, a }
                   Otherwise, remove activity a
               End if
Case IV        Else
                   Remove activity a                                                  // Coming from remote
Case IV*       While parent== conditional split, replace parent with unconditional split
               End if                                                                 // Updating parent
           End for
       End for
```

FIG. 1B

METHOD FOR AUTOMATED GENERATION OF MINIMAL PARTITIONING OF A PROCESS SPECIFICATION FOR SUPPORTING ITS DISTRIBUTED EXECUTION

FIELD OF THE INVENTION

Embodiments are related to process models, process engine architectures, distributed processing, and distributed process engine architectures.

BACKGROUND

Currently, process execution engines execute process specifications often given as and herein referred to as process scripts by instantiating the process definition and orchestrating the invocation or execution of each of the activities/services contained therein. Typically, the orchestration includes marshaling and linking inputs and outputs of different services.

One example of current techniques is a centralized approach with a single execution engine invoking services even though they may be executed in a distributed manner. This is the most widely used approach.

Another example of a current technique is a distributed approach. Typically, a single process definition is portioned by a person into multiple process scripts that can be executed independently by different engines. The execution of the multiple scripts is orchestrated to produce the same result as the original script.

Recently, automated approaches have been proposed to automatically partition a BPMN (Business Process Modeling Notation) process definition and provide a communication protocol for coordinating the distributed orchestration engines. Quiroz et al., teach such an approach in U.S. patent application Ser. No. 13/403,440 filed on Feb. 23, 2002, entitled "Method and System for Automatically Partitioning and Processing a Business Process", and herein included by reference in its entirety. A method that does not efficiently utilize resources is described in Pieter Hens, Monique Snoeck, Manu De Backer, and Geert Poels. Transforming Standard Process Models to Decentralized Autonomous Entities, in 5th SIKS/BENAIS Conference on Enterprise Information Systems, 2010.

However, widespread adoption of automated methods and systems for process partitioning is not yet a reality. In addition to the youth of the distributed cloud-based process deployment, this is due in part to the small number of methods that exist and the difficulty in implementing these methods due to their specificity (e.g., process representation dependencies) and their complexity. Systems and methods for addressing shortcomings in the current art and to spur greater adoption of automated methods for process partitioning are needed.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

Aspects of the embodiments address limitations and flaws in the prior art by deriving subordinate specifications from a process specification and submitting the subordinate specifications amongst a number of groups. A group is defined as a context for the execution of one or more process services such as an execution engine, data center, computer, computer duster, cloud, or other set of shared resources. The number of subordinate graphs equals the number of groups. The technique disclosed herein inherently maintains the order in which activities are executed while avoiding the need for passing control messages between the groups.

A process specification, herein also referred to as a script or process script, is a formal description of a process for obtaining a result. The process can include a number of activities that are to be executed in a precisely defined sequence and the precise sequence can be represented by a process graph. For this reason, a process specification specifies a process graph as well as a process. The nodes in the process graph can represent activities to be executed, conditional and unconditional splits, synchronized and unsynchronized joins, and other items.

It is, therefore, an aspect of the embodiments that a process specification is received. The process specification specifies activities to be performed by a number of groups where each activity is specified to be performed by one group. For example, five activities can be specified to be performed by two groups with two activities specified for one group and three specified for the other. The process specification can be expressed as a process graph. Similarly, a process graph can be expressed as a process specification. The activities are represented by nodes in the graph. Each node is associated with the group specified to perform the activity represented by that node.

It also an aspect of the embodiments that the process is to be performed by at least two groups. Given two activities from different groups such that one must be performed before the other according to the original process graph, the one that must be performed first can be referred to as the first activity and its corresponding group as the first group, and the other can be referred to as the second activity and its corresponding group as the second group.

It is a further aspect of the embodiments to derive at least two subordinate specifications, also referred to herein as fragments, from the process specification. There will be one and only one distinct subordinate specification for each of the defined groups (i.e., there will be two or possibly more specifications corresponding to the number of groups). As such, given two groups identified as first and second as above, we can identify their two corresponding subordinate specifications as first and second, respectively. All of the activities specified by the first subordinate specification are to be performed by the first group. Similarly, the second group performs the activities specified by the second subordinate specification and so one for additional groups and subordinate specifications. As with the process specification, the subordinate specifications can be expressed as subordinate graphs and vice versa.

It is still another aspect of the embodiments to distribute the subordinate specifications to the groups. Since there is a one-to-one correspondence between groups and subordinate processes, each group executes its own subordinate process.

It is a yet further aspect of the embodiments that the first subordinate graph (i.e., that which contains the first activity) contains a message send activity node. The message send activity node is created when the first subordinate specification is derived from the process specification. The message send activity represents a data transmission activity performed by the first group. The data is sent to a corresponding message receive activity.

The message receive activity is represented by a message receive activity node in the second subordinate graph (i.e., that which contains the second activity). The message receive activity node is created when the second subordinate specification is derived from the process specification. The message receive activity waits for the data sent by the message send activity.

It is possible for the message send activity to never send data to the message receive activity (e.g., when the path of the send activity is not taken). In such cases, the message receive activity would remain blocked. The second subordinate process, however, still completes because of the manner in which the subordinate processes are derived. More specifically, in such cases the second graph has a path to completion that does not pass through the message receive activity node.

The derived subordinate processes are implemented and executed by the various groups in such a manner that the specified process is carried out to completion. The manner of the derivation guarantees that activities specified to be performed in order are performed in order while other activities can be performed concurrently.

BRIEF DESCRIPTION OF THE FIGURES

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

FIG. 1A illustrates a first portion of an algorithm for deriving subordinate graphs from a process graph, in accordance with aspects of the embodiments;

FIG. 1B illustrates the remainder of the algorithm for deriving subordinate graphs from a process graph, in accordance with aspects of the embodiments;

DETAILED DESCRIPTION

Figure 2:
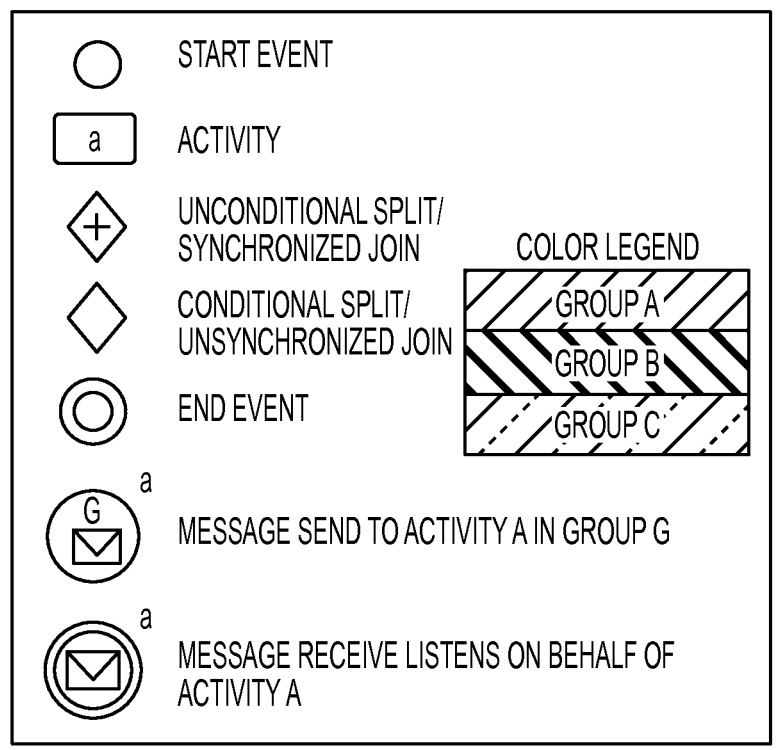
FIG. 2 illustrates a legend for understanding the nodes in process graphs presented in other figures, in accordance with aspects of the embodiments.

The particular values and configurations discussed in these non-limiting examples can be varied and are cited merely to illustrate embodiments and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The embodiments include systems and methods for partitioning a process definition within a system architecture that enables the communication and meta-orchestration of multiple distributed engines. The partitioning method creates separate scripts for each group where each script has the same representation as the original control flow, but keeps local services and replaces remote services with data flow messages and synchronization points. This method ensures that the resulting process has the same result as the original process executed with a single engine and has additional advantages over existing methods. These include:

the number of partitions of the process is minimized (equal to the number of distributed engines);

the communication between engines is minimized (only data flow messages are passed between engines without the need for control flow messages);

no dependency on a specific process representation, such as BPMN; and reduced implementation complexity, which should facilitate more widespread adoption.

A core benefit of this system is that, like previous automated partitioning methods (see U.S. patent application Ser. No. 13/403,440), because a single process can have an arbitrary number of possible partitions based on conditions that change in time, the application of this method can be done dynamically and automatically.

As mentioned above, process execution can be orchestrated in a distributed manner, and despite the predominantly manual approaches, there has been related work that provides automated methods for this purpose. The method described in [Hens et al., '10] divides a process into individual tasks (services), each of which is executed by an independent process engine. This has two main drawbacks in practice: relating to the underutilization of the mechanisms of existing execution engines to manage control flow, and to resource inefficiencies resulting from the lack of feedback for services that are not executed. Both of these drawbacks are addressed in more recent work (see U.S. patent application Ser. No. 13/403, 440), which attempts to maximize reuse of existing execution engine functionality and reduce execution inefficiencies by using additional control flow messages for paths that are not taken. However, this state-of-the-art method is complex and cannot guarantee that the number of process fragments produced is minimal (which explains its use of the control flow messages). As explained above, the embodiments provide a simple method with such a guarantee. By guaranteeing also that all process fragments terminate given only data flow messages, the drawback of resource inefficiency is addressed without requiring additional control flow messages.

The technique consists of creating one modified copy of the original process workflow definition for each of a given number of execution groups, given that each service is associated with a particular group. A group is defined as a context for the execution of one or more process services such as an execution engine, data center, computer, computer cluster, cloud, or other set of shared resources. The modifications of the copies of the original process correspond to the insertion of message send and receive elements (to be defined below) according to the locality of services with respect to a given group.

Many of the concepts that will be used throughout this document are defined below, some of which are illustrated in FIG. 1. Please note that, for convenience and clarity, herein we will use several concepts and icons that are particular to the BPMN specification [BPMN 2.0]. However, unlike previous methods, this invention does not rely on specific elements from this specification and can therefore be applied to any number of process and workflow specification and execution standards.

FIGS. 1A and 1B illustrate an algorithm for deriving subordinate graphs from a process graph in accordance with aspects of the embodiments. The algorithm is exemplary of one embodiment and is provided in a pseudo-code format that is easily understood by those practiced in the art of computer programming. The algorithm accepts a process specification as input with each activity having a group label (l). The algorithm produces N subordinate specifications where N equals the number of groups. The number of groups can be provided as part of the process specification or can be a property of the processing architecture that is to implement the process. In either case, the number of subordinate specifications equals the numbers of groups.

FIG. 2 illustrates a legend for understanding the nodes in process graphs presented in other figures, in accordance with aspects of the embodiments. A process specification and the subordinate process specifications can be interpreted as graphs having nodes. Many of the examples herein are provided as expressions of or manipulations of graphs. A description of concepts and elements of the legend of FIG. 2 follows.

Workflow: A directed graph connecting a number of activities and control flow elements corresponding to a process or some other orchestration of activities (e.g., scientific workflow).

Activity: An element of a workflow requiring the execution of work (e.g., the transformation/generation of data). The services of a process are examples of activities.

Control flow element: Any element in the graph that is not an activity and that determines the sequence and manner in which activities are executed. Splits and joins are examples of the control flow elements that are relevant for this invention.

Unconditional split: Control flow element with one incoming path and multiple outgoing paths that, when traversed, causes all of its outgoing paths to become active (start executing), regardless of the results of previous activities.

Conditional split: Control flow element with one incoming path and multiple outgoing paths that, when traversed, causes some of its outgoing paths to become active (start executing), depending on the results of previous activities or other workflow elements (e.g., events which are not relevant to this invention).

Unsynchronized join: Control flow element with multiple incoming paths and one outgoing path. When any of its incoming paths are completed, it causes its outgoing path to become active.

Synchronized join: Control flow element with multiple incoming paths and one outgoing path. Its outgoing path will only become active after all of its incoming paths have completed.

Start event: Control flow element that constitutes an entry point for the execution of a workflow. All outgoing paths from start will become active when the execution engine starts executing the workflow.

End event: Control flow element that signals to the execution engine that the workflow has finished. In a distributed setting, a workflow is considered to be finished when all of its fragments (see below) reach End.

Group: The context of execution of a set of activities. We assume each activity is labeled with a particular group.

Fragment: The modified copy of the original process that is created for a particular group. It is executable in an unmodified instance of a process engine.

Local activity: An activity whose label corresponds to the fragment that contains it (e.g., that executes in the group with that fragment).

Remote activity: An activity whose label is different from the fragment that contains it (e.g., that executes in another group).

Message send element (denoted by Send {group, activity}): Given two fragments, for groups A and B, a message send element will cause, when traversed in the execution of fragment A, a message to be sent to a meta-orchestrator for group B, which will inject it into the execution engine of fragment B. The message content contains the identifier of an activity of the workflow and any data produced by the execution of previous activities that was propagated by the previous execution engines. A meta-orchestration system to support this method is beyond the scope of this document, but can be found (see U.S. patent application Ser. No. 13/403,440).

Message receive element (denoted by Receive {activity}): A message receive element in fragment B will cause the execution engine to wait (suspend execution) on the given path and listen for incoming messages from its meta-orchestrator. It is associated with an activity in the workflow such that the meta-orchestrator will only deliver the message to the receive element if it corresponds to that activity. Once the message is received by the execution engine, execution along the path will continue and the contents of the message will be available as outputs of the receive element.

Certain aspects of the operation are now discussed as, in essence, a proof. The formalism of a proof is used because it establishes that the distributed execution of the subordinate processes by the groups produces the same output as would the original process and that all the subordinate process finish.

Two items must be established to ensure that the subordinate processes, in combination, produce the same result as the original process. One item is that no activity is executed out of order. The other is that an activity in a conditional split that is not taken is not executed.

Figure 3:
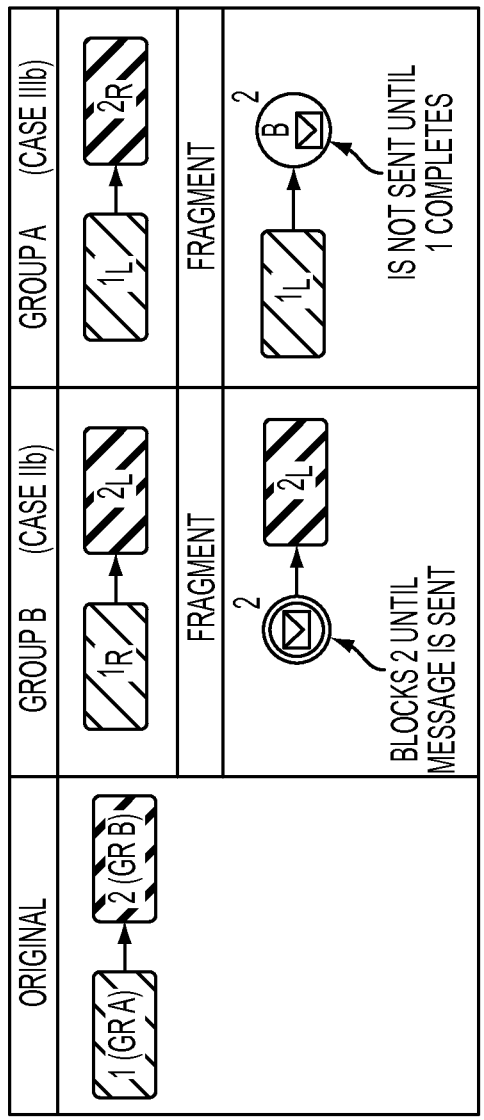
FIG. 3 illustrates deriving two subordinate graphs from a process graph having no branches, in accordance with aspects of the embodiments.
Figure 4:
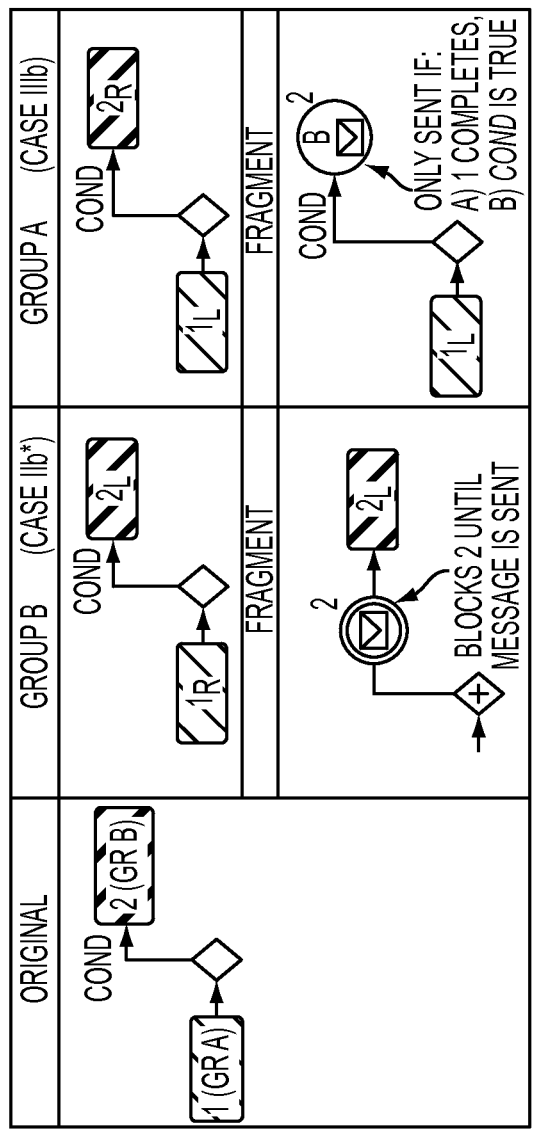
FIG. 4 illustrates deriving two subordinate graphs from a process graph having a conditional split, in accordance with aspects of the embodiments.
Figure 5:
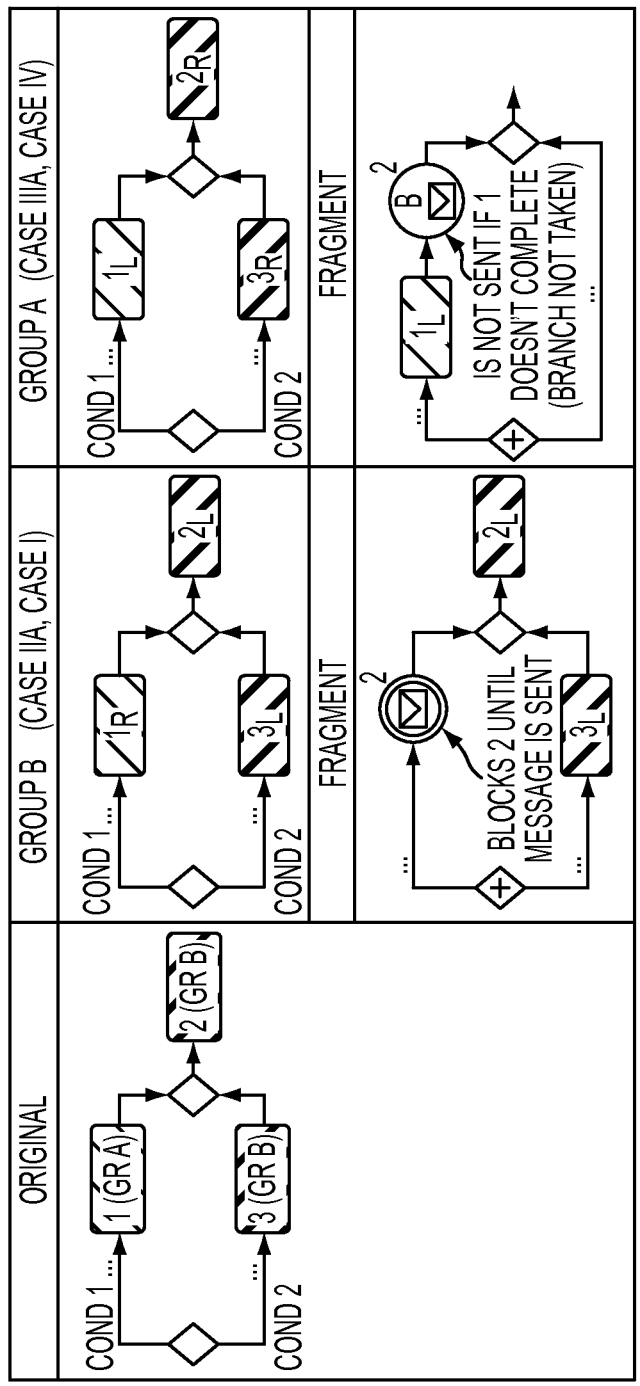
FIG. 5 illustrates deriving two subordinate graphs from a process graph having a conditional split and an unsynchronized join, in accordance with aspects of the embodiments.

FIGS. 3-5 illustrate proof that an activity is not executed out of order. The example configuration depicted in. FIG. 3 addresses sequential chains of activities. For a sequential chain of activities, any local activity preceded by remote activities (e.g., case II of FIGS. 1A-1B) waits with a receive message construct, which is only sent after the remote activity completes. The original graph has group A performing activity 1 and then group B performing activity 2. Two subordinate process are produced, one for group A, another for group B. To obtain the subordinate process for group A, the original process is copied. Activity 1 is local (indicated by subscripted "L") and is left unchanged. Activity two is remote (indicated by subscripted "R") and is replaced by a message send activity. The subordinate process for group B is derived similarly. Remote process 1 is replaced by a message receive activity that must complete before local activity 2 is performed. As such, it is seen that activity 2 cannot progress until activity 1 completes and group A sends a message to group B.

FIG. 4 illustrates a case for a branch in a group controlled by an unconditional split that replaced a conditional split (case IIb* and case IV*). The original process has activity 2 conditionally following activity 1. The case wherein the condition is not met is addressed elsewhere. As can be seen, the graph for group A is little changed having the remote activity 2 replaced by a message send activity. The graph for group B looks quite different. As seen in the exemplary algorithm of FIGS. 1A-1B (case IIb*), a message receive activity is inserted directly in front of the local activity 2 and the conditional split is replaced by an unconditional split. Here, performance by group B is blocked until it receives the message from group A. Group A only sends the message if the condition is true and after performing activity 1. The order and conditions for execution have been preserved.

FIG. 5 illustrates a case where a local activity directly follows an unsynchronized join. Group A is to perform activity 1. Group B is to perform activities 2 and 3. Activity 1 is performed if a condition is met, otherwise activity 3 is performed. An unconditional join merges the execution paths such that activity 2 is performed if the condition is met or is not. So, based on the condition, activity 2 follows activity 1 or it follows activity 3. The subordinate processes are derived in accordance with the approach shown in FIGS. 1A-1B. Here, if there is any local activity in all branches before the join, the activity cannot execute beforehand. Otherwise, consider a scenario in which a branch with only remote activities (or no activities) is controlled by an unconditional split that replaced a conditional split (case IIb*). When the activity is considered coming from that branch, the state would be remote (case II) (otherwise, the conditional split would not have been replaced). Therefore, a message receive construct for the activity would have been inserted before the join so that the branch cannot complete until that message is received.

It is also important that an activity in a conditional split that is not taken is not executed because of replacing a conditional with an unconditional split. To establish this, consider the first local activity after an unconditional split that replaced a conditional split. Because the split was replaced, the state when the activity was considered was remote (case II). Therefore, the activity is preceded by a message receive construct. Now, consider the last local activity before the conditional split (in the remote group where it was not replaced). The message send construct to the activity follows the conditional split (case III) so if the branch is not taken, the message will never be sent (see FIG. 3). For all other activities, the activity chain proof applies.

Figure 6:
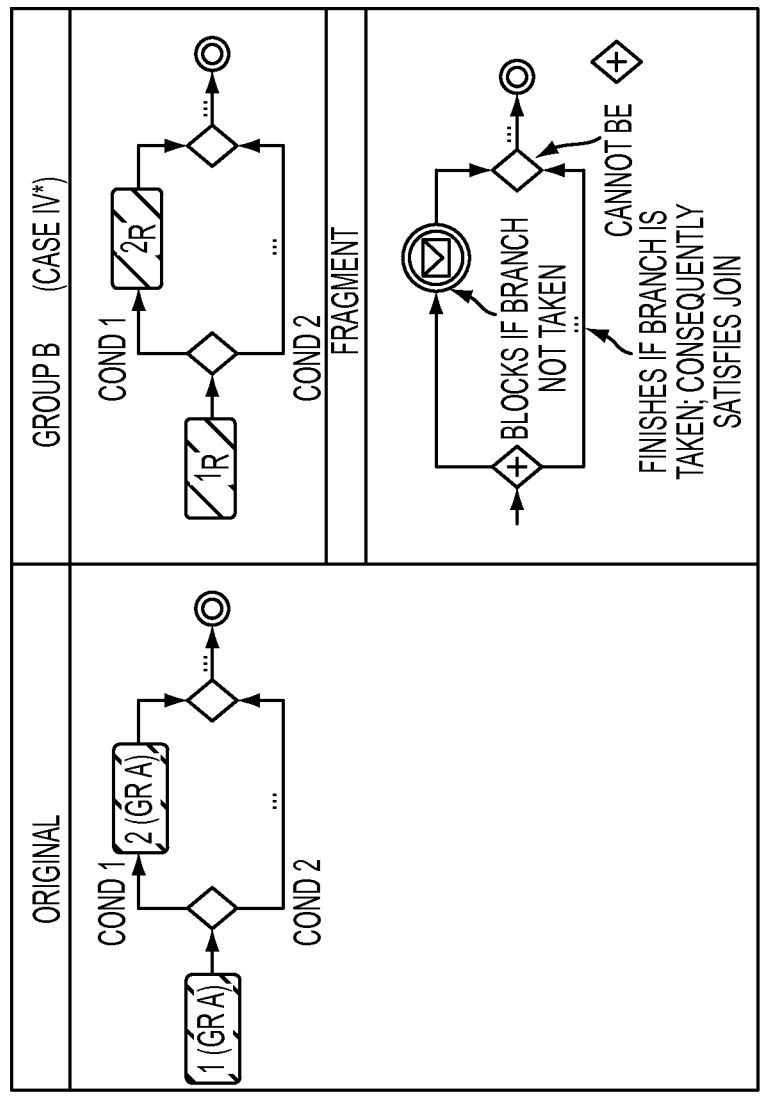
FIG. 6 illustrates a subordinate graph running to completion when one branch is permanently blocked by a message receive activity, in accordance with aspects of the embodiments.

It is also important that all subordinate processes finish just as the original process runs to completion. As such, subordinate processes that are waiting for messages that are never received must not cause the process to get stuck. For any path that is supposed to be taken, the sequence proof also guarantees that messages will be sent and received, assuming that all activities terminate. In the discussion above, there was a case where a local activity following an unconditional split that replaced a conditional split would not be executed because, if the branch isn't taken, the corresponding message is not sent. However, in this case some other branch is taken and the process follows that branch to completion. Because a synchronization join cannot close a conditional split, the termination of that branch will allow the process to continue. FIG. 6 illustrates a subordinate graph running to completion when one branch is permanently blocked by a message receive activity in accordance with aspects of the embodiments.

Figure 7:
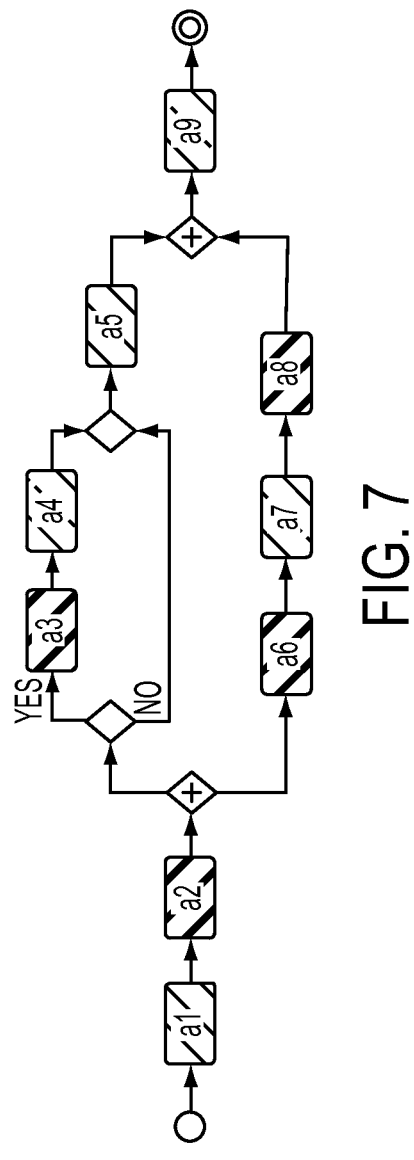
FIG. 7 illustrates a process graph having activities for three different groups, in accordance with aspects of the embodiments.

FIG. 7 illustrates a process graph having activities for three different groups in accordance with aspects of the embodiments. Group A is to perform activities a1 and a5. Group B is to perform activities a2, a3, a6, and a8. Group C is to perform activities a4, a7, and a9. All the different control flow splits and joins are used in this example.

Figure 8:
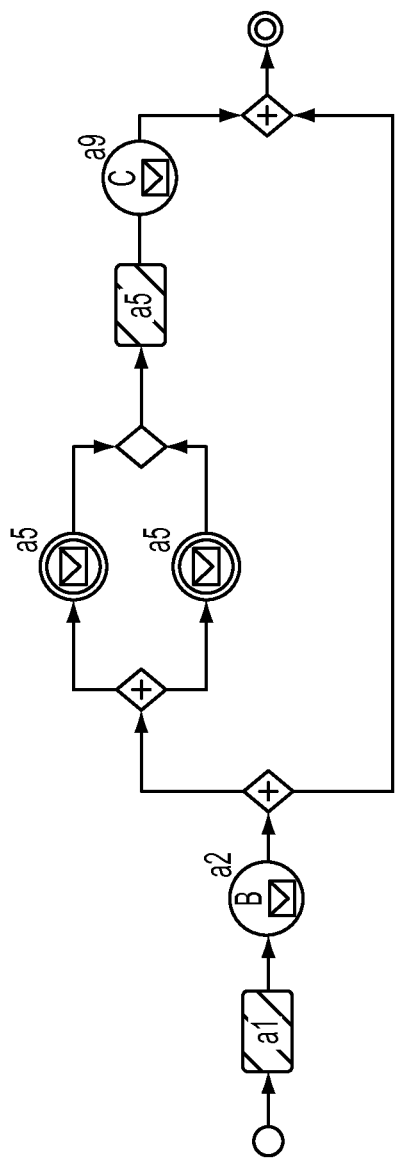
FIG. 8 illustrates a subordinate graph for group A derived from the process graph of FIG. 7, in accordance with aspects of the embodiments.

FIG. 8 illustrates a subordinate graph for group A derived from the process graph of FIG. 7, in accordance with aspects of the embodiments. Group A performs activity a1 and then sends a message (a2) to Group B. An unconditional is then traversed. One branch leads immediately to a synchronized join. The other leads to another unconditional split and, on either branch, the sub-process waits for a message (a5). When the message is received, the sub-process performs activity a5, then sends a message (a9) to group C. Both execution branches now combine at the synchronized join and the sub-process proceeds to terminate.

Figure 9:
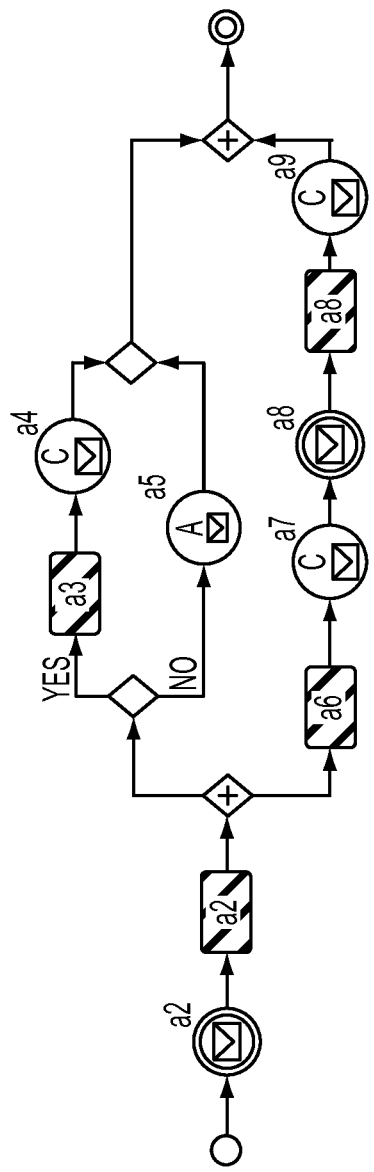
FIG. 9 illustrates a subordinate graph for group B derived from the process graph of FIG. 7, in accordance with aspects of the embodiments.

FIG. 9 illustrates a subordinate graph for group B derived from the process graph of FIG. 7, in accordance with aspects of the embodiments. Group B immediately blocks waiting for a message (a2). Once the message is received, activity a2 is performed and then the sub-process encounters an unconditional split. Along one branch, the process is sequential and performs activity a6, sends a message (a7), block awaiting a message (a8), performs activity a8, sends a message (a9), and then encounters a synchronized join, Along the other branch, if a condition is not met, the process sends a message (a5) and proceeds to the synchronized join. Otherwise, the process performs activity a3, sends a message (a4), and proceeds to the synchronized join. The sub-process terminates after the synchronized join.

Figure 10:
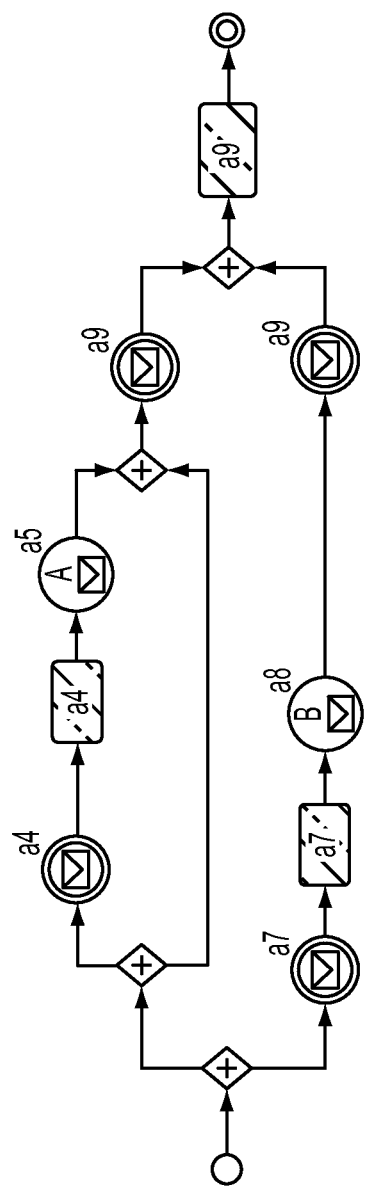
FIG. 10 illustrates a subordinate graph for group C derived from the process graph of FIG. 7, in accordance with aspects of the embodiments.

FIG. 10 illustrates a subordinate graph for group C derived from the process graph of FIG. 7, in accordance with aspects of the embodiments. Group C immediately encounters an unconditional split. Along one branch, the sub-process proceeds sequentially by awaiting a message (a7), performing activity a7, sending a message (a8), and awaiting a message (a9) before meeting a synchronized join. Along the other branch, the process again unconditionally splits with one branch immediately proceeding to a synchronized join (essentially a no-op). Along the top branch, the sub-process awaits a message (a4), performs activity a4, and sends a message (a5). The synchronized join then leads to awaiting a message (a9). At this point, two execution paths are awaiting a message (a9) and as such must receive two messages (a9) before proceeding through the synchronized join to perform activity a9 and then terminate.

Figure 11:
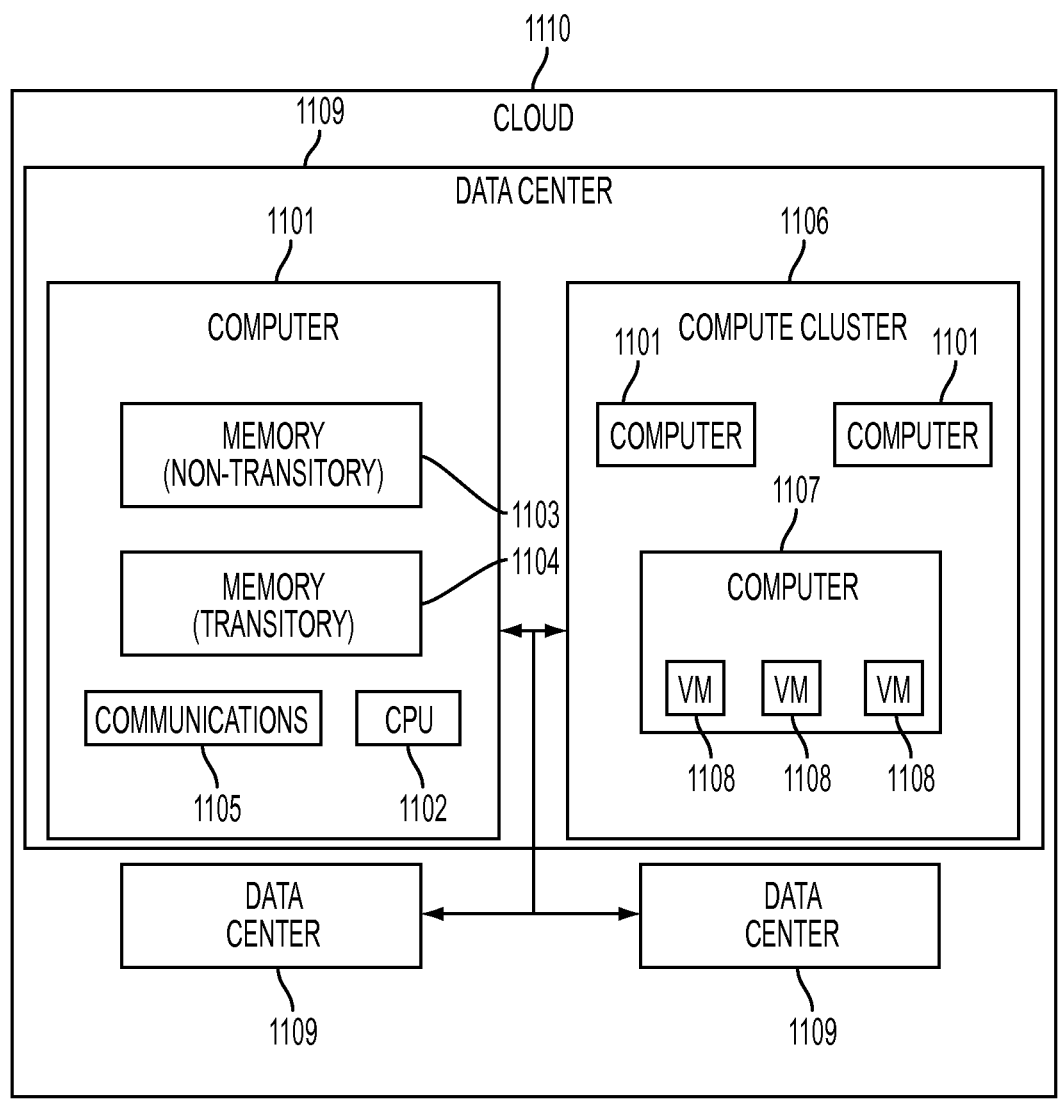
FIG. 11 illustrates groups running a process distributed in accordance with aspects of the embodiments.

FIG. 11 illustrates groups running a process distributed in accordance with aspects of the embodiments. A group can be a computer 1101, a compute cluster 1106, a data center 1109, or a cloud 1110. A computer has one or more processor 1102, transitory memory 1104, non-transitory memory 1103, and communications circuits 1105. Those practiced in the art of computing are familiar with the components of a computer. A compute cluster 1106 can include many computers 1101. Some of those computers 1107 can run virtual machines (VMs) 1108. A VM 1108 is a program that can run other programs and, to those programs, appears to be an actual computer. A data center 1109 can include numerous computers 1101 and compute clusters 1106 that are typically co-located and in communication with one another. A computing cloud 1110 can encompass many data centers 1109. The data centers 1109 can be located at many locations around the world and are in communication with each other through the internet or through private networks. The process specification is typically selected or created by a person who submits it to a computer running an algorithm such as that of FIGS. 1A-1B. The derived subordinate specifications can then be distributed amongst numerous groups for subsequent performance.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein, generally refers to software modules or implementations thereof. Such modules can be utilized separately or together to form a program product that can be implemented through signal-bearing media including transmission media and recordable media.

It will be appreciated that several of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for a plurality of groups to implement a process, the method comprising:
    receiving a process specification for the process wherein the process comprises a plurality of activities, wherein the process specification specifies a process graph, wherein the process graph comprises a plurality of activity nodes, wherein each activity node is associated with one group, wherein each one of the groups is associated with at least one activity node, and wherein that group associated with any one of the activity nodes is to perform all activity represented by that one of the activity nodes, and wherein the groups comprise a first group and a second group or more groups;
    deriving a plurality of subordinate specifications from the process specification wherein each one of the subordinate specifications specifies one of a plurality of subordinate graphs comprising at least one activity node all of which are associated with the same group, wherein the plurality of subordinate graphs comprise a first graph comprising a message send activity node associated with the first group and a second graph comprising a message receive activity node associated with the second group, wherein the message send activity node represents a message send activity wherein message receive activity node represents a message receive activity, wherein the message receive activity delays execution until it receives data from the message send activity, and wherein at least one of the subordinate graphs comprises a non-conditional split because the process graph comprises a conditional split; and
    distributing the subordinate specifications to the groups such that each group implements and executes a subordinate process to therefore perform the process in a distributed manner.

2. The method of claim 1 wherein each one of the groups is a data center, a compute cluster, or a cloud wherein a cloud comprises a plurality of virtual machines in communication with one another.

3. The method of claim 1,
    wherein the process graph further comprises at least two activity nodes, where all activity represented by one (the first activity) must be performed before all activity represented by the other (the second activity), and the first activity node is associated with one group (the first group) and the second activity node is associated with a different group (the second group),
    wherein the first graph comprises the first activity node and the message send activity node,
    wherein all activity represented by the message send activity node is specified to occur after all activity represented by the first activity node,
    wherein the second graph comprises the second activity node and the message receive activity node, and
    wherein all activity represented by the message receive activity node is specified to occur before all activity represented by the second activity node.

4. The method of claim 1,
    wherein the process graph further comprises a conditional split and at least two activity nodes where all activity represented by one (the first activity) must be performed before all activity represented by the conditional split and all activity represented by the other (the second activity) must be performed after the conditional split if a condition is met, and the first activity node is associated with one group and the second activity node is associated with a different group (the second group),
    wherein the first graph comprises the first activity node, the conditional split, and the message send activity node,
    wherein all activity represented by the message send activity node is specified to occur after all activity represented by the first activity node and only if the condition is met,
    wherein the second graph comprises the second activity node, the message receive activity node, and an unconditional split, and
    wherein all activity represented by the message receive activity node is specified to occur before all activity represented by the second activity node.

5. The method of claim 1,
    wherein the process graph further comprises a conditional split and at least three activity nodes, where all activity represented by one (the first activity) must only be performed after the conditional split if a condition is met, where all activity represented by another one (the third activity) must only be performed after the conditional split if the condition is not met, where all activity represented by yet another activity node (the second activity) must be performed after either the first activity or the third activity, the first activity node is associated with one group (the first group), the second activity node is associated with a different group (the second group), and the third activity node is associated with the second group,
    wherein the first graph comprises the first activity node and the message send activity node,
    wherein all activity represented by the message send activity node is specified to occur after all activity represented by the first activity node,
    wherein the second graph comprises the second activity node, the third activity node, the message receive activity node, and an unconditional split, and wherein all activity represented by the second activity node is specified to occur after all activity represented by the third activity node completes or after all activity represented by the message receive activity node completes.

6. The method of claim 5, wherein each one of the groups is a data center, a compute cluster, or a cloud wherein a cloud comprises a plurality of virtual machines in communication with one another.

7. A system for distributing a process for synchronized and parallel execution by N groups, the system comprising:
   a processor;
   a data bus coupled to said processor; and
   a computer-usable medium embodying computer code, said computer-usable medium being coupled to said data bus, said computer program code comprising instructions executable by said processor and configured for:
      receiving a process specification for the process wherein the process comprises a plurality of activities, wherein the process specification specifies a process graph, wherein the process graph comprises a plurality of activity nodes, wherein each activity node is associated with one group, wherein each one of the N groups is associated with at least one activity node, and wherein the group associated with any one of the activity nodes is to perform all activity represented by that one of the activity nodes;
      deriving N subordinate specifications from the process specification wherein each one of the subordinate process specifications is associated with one of the groups and wherein at least two of the subordinate specifications comprise corresponding synchronization elements wherein corresponding synchronization elements comprise a message send activity and a message receive activity, and wherein the message receive activity delays execution until it receives data from the corresponding message send activity, and wherein at least one of the subordinate graphs comprises a non-conditional split because the process graph comprises a conditional split; and
      distributing the subordinate specifications to the groups such that each group implements and executes a subordinate process to therefor perform the process in a distributed manner.

8. The system of claim 7 wherein one of the groups is a data center.

9. The system of claim 7 wherein one of the groups is a compute cluster.

10. The system of claim 7 wherein one of the groups is a cloud wherein a cloud comprises a plurality of virtual machines in communication with one another.

11. The system of claim 10 wherein at least one of the subordinate graphs comprises a non-conditional split because the process graph comprises a conditional split.

12. The system of claim 7, wherein the N groups comprise a first group and a second group,
   wherein each one of the N subordinate specifications specify one of N subordinate graphs,
   wherein the N subordinate graphs comprise a first graph and a second graph,
   wherein the process graph further comprises at least two activity nodes with a first activity node associated with the first group and a second activity node associated with the second group,
   wherein all activity represented by the first activity node is specified to occur before any activity represented by the second activity node,
   wherein the first graph comprises the first activity node and the message send activity node,
   wherein all activity represented by the message send activity node is specified to occur after all activity represented by the first activity node,
   wherein the second graph comprises the second activity node and the message receive activity node, and
   wherein all activity represented by the message receive activity node is specified to occur before all activity represented by the second activity node.

13. A non-transitory processor-readable medium storing code representing instructions to cause a processor to perform a process to distribute a process for synchronized and parallel execution by N groups, the code comprising instructions to:
   receive a specification for the process wherein the process comprises a plurality of activities, wherein the specification specifies a process graph, wherein the process graph comprises a plurality of activity nodes, wherein each activity node is associated with one group, wherein each one of the N groups is associated with at least one activity node, and wherein the group associated with any one of the activity nodes is to perform all activity represented by that one of the activity nodes;
   derive N subordinate specifications from the process specification wherein each one of the subordinate process specifications is associated with one of the groups and wherein at least two of the subordinate specifications comprise corresponding synchronization elements wherein corresponding synchronization elements comprise a message send activity and a message receive activity, wherein the message receive activity delays execution until it receives data from the corresponding message send activity, and wherein at least one of the subordinate graphs comprises a non-conditional split because the process graph comprises a conditional split; and
   distribute the subordinate specifications to the groups such that each group implements and executes a subordinate process to therefor perform the process in a distributed manner.

14. The non-transitory processor-readable medium of claim 13 wherein one of the groups is a cloud wherein a cloud comprises a plurality of virtual machines in communication with one another.

15. The non-transitory processor-readable medium of claim 14 wherein one of the groups is a data center.

16. The non-transitory processor-readable medium of claim 15 wherein one of the groups is a compute cluster.

17. The non-transitory processor-readable medium of claim 16, wherein the N groups comprise a first group and a second group,
   wherein each one of the N subordinate specifications specify one of N subordinate graphs comprising a first graph and a second graph,
   wherein the process graph further comprises a conditional split, a first activity node associated with the first group and a second activity node associated with the second group,
   wherein all activity represented by the first activity node is specified to occur before the conditional split,
   wherein all activity associated with the second activity node is specified to occur after the conditional split if a condition is met,
   wherein the first graph comprises the first activity node, the conditional split, and the message send activity node, wherein all activity represented by the message send activity node is specified to occur after all activity represented by the first activity node and only if the condition is met, wherein the second graph comprises the second activity node, the message receive activity node, and an unconditional split, and wherein all activity represented by the message receive activity node is specified to occur before all activity represented by the second activity node.

\* \* \* \* \*